July 30, 1940.   E. T. FERNGREN   2,209,877
METHOD OF FORMING HOLLOW ARTICLES FROM PLASTIC MATERIAL
Original Filed Dec. 3, 1930   2 Sheets-Sheet 1
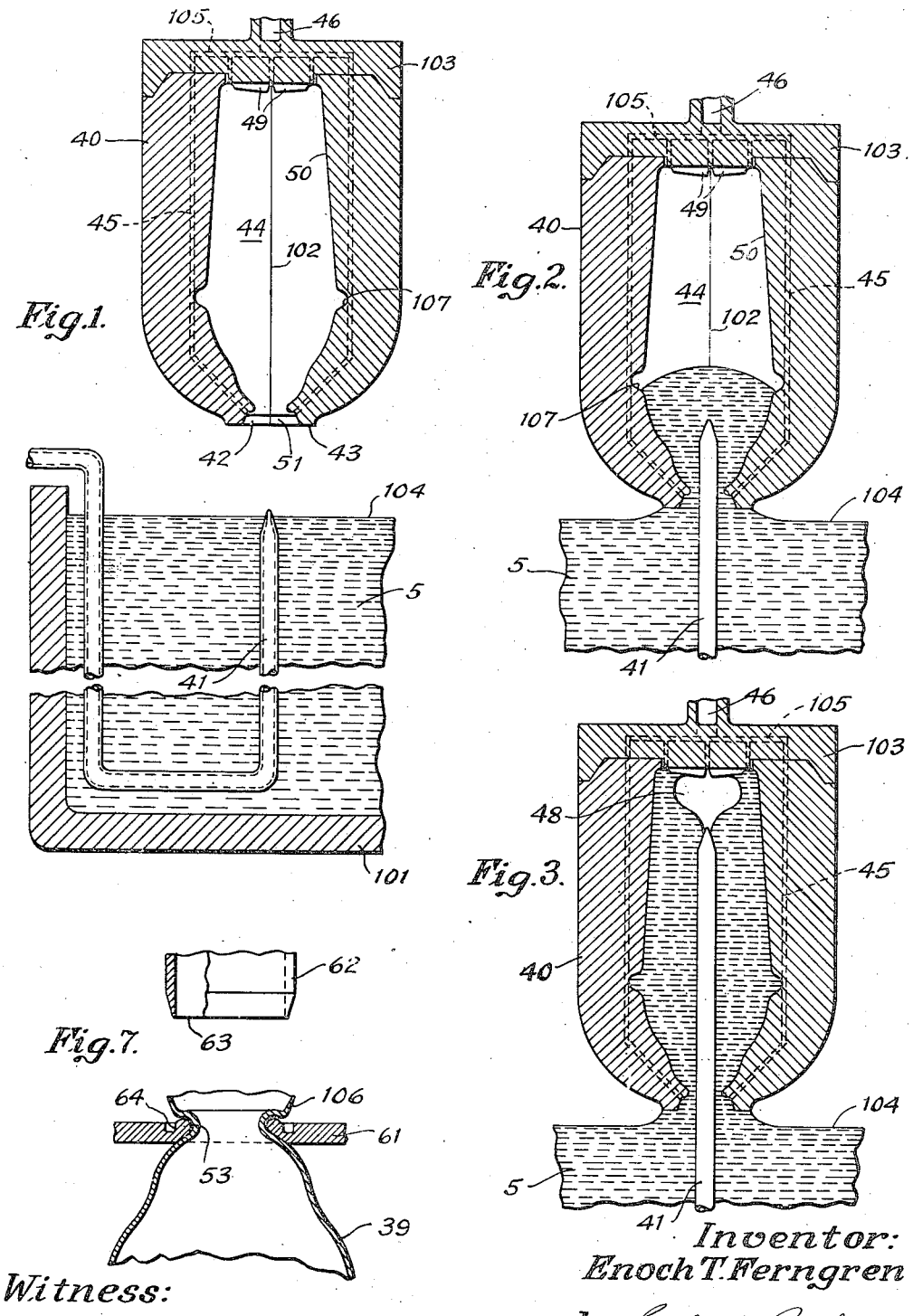

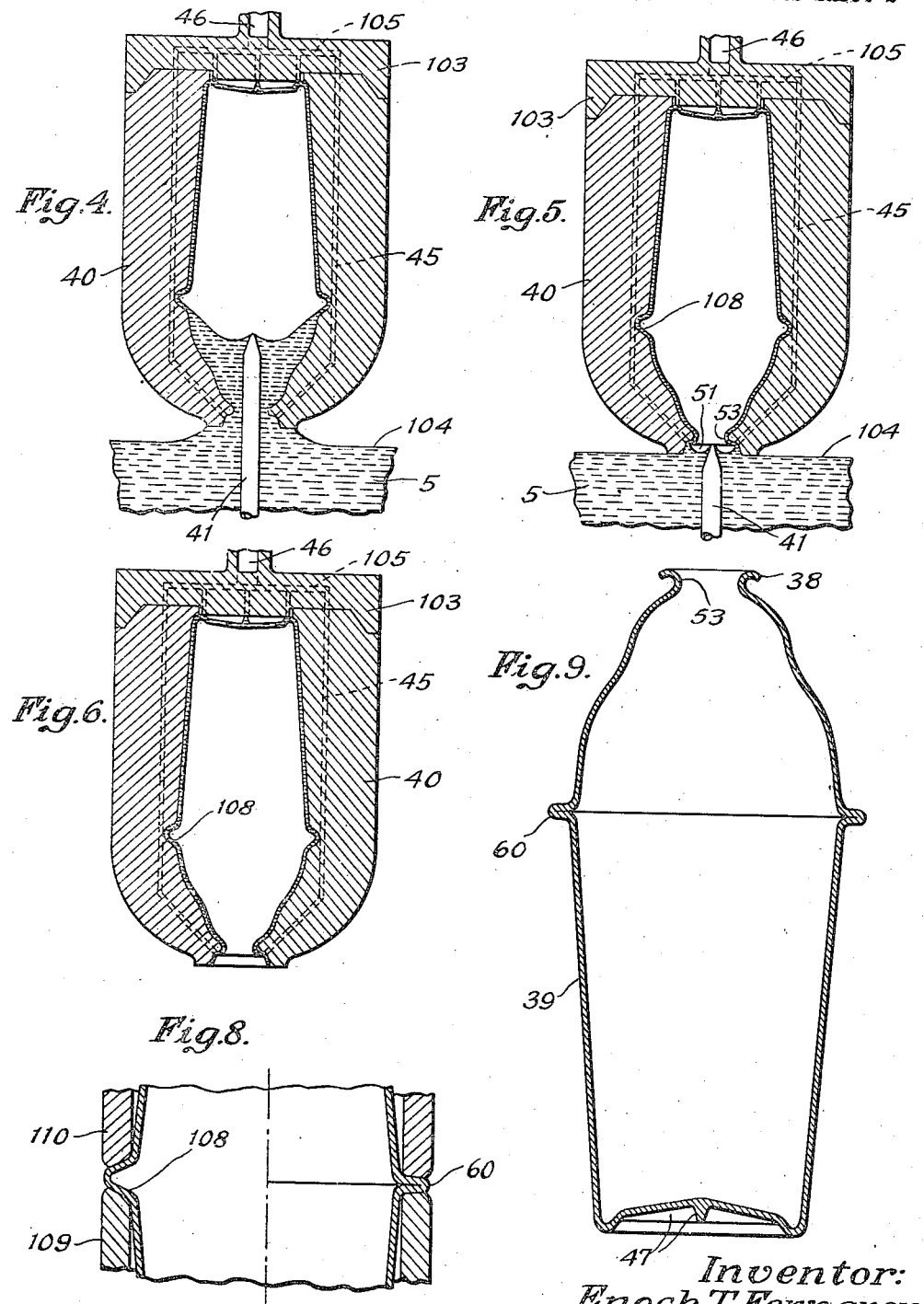

Patented July 30, 1940

2,209,877

UNITED STATES PATENT OFFICE 2,209,877

METHOD OF FORMING HOLLOW ARTICLES FROM PLASTIC MATERIAL

Enoch T. Ferngren, Jackson Heights, Long Island, N. Y., assignor to Plax Corporation, Hartford, Conn., a corporation of Delaware Original application December 3, 1930, Serial No. 499,771. Divided and this application May 26, 1937, Serial No. 144,777

15 Claims. (Cl. 18—58)

This application relates to a method of forming hollow articles, such for example as bottles, from plastic material of an organic nature, and is a division of my prior and copending application, Serial No. 499,771, filed December 3, 1930 now Patent No. 2,099,055, granted Nov. 16, 1937. More specifically, the invention of this application relates to a method of producing hollow articles, such as bottles, from plastic material in liquid form, and in fact from any suitable plastic material of organic nature which may be converted into a liquid condition either by suitable treatment of the material itself or by the admixture thereof with solvents, or liquid dispersing agents, or by some combinations thereof. Such liquid plastic materials must further be of a nature that a film of plastic material may be formed therefrom to form the article to be made. Articles produced in accordance with my present invention form the subject matter of my said copending application.

Among the objects of the present invention are to provide a method of forming hollow articles, such as bottles, from liquid plastic material which may be caused to form a film on the surface of a mold or mold cavity, specifically by the aid of differential pressures effective on the film or on the material, and more particularly to form a film on the wall of the cavity of a mold, in which suction may be applied through the mold walls to fill the cavity thereof with the liquid plastic material, which will deposit a film on the interior surface of the mold cavity; and by then causing the interior portions of the liquid material to flow out of the mold cavity leaving the film deposited on the walls thereof, which film after suitable rigidification forms the desired article.

A further object of the invention is to provide a method of forming articles as above generally set forth, in which provision is made for reinforcing or strengthening the whole or a desired part of the article by the formation of a desired thickness of film or wall section of the plastic material, and particularly to provide a method by which a selected portion, for example the upper or shoulder portion of a bottle, may be made heavier than the lower or body portion thereof.

A further object of the present invention is to provide suitable methods in conjunction with the above method of producing a film-type hollow article by which the film may be suitably rigidified in situ in the mold in which it is formed, the manner of rigidification depending, of course, upon the nature and composition of the plastic material used.

A further object of the invention is to provide for the finishing of hollow articles, such as bottles, made by the process aforesaid, including the trimming of surplus material from the neck or mouth portion thereof.

A further specific object of the invention is to provide for the finishing of articles formed as aforesaid by the provision of an external peripheral flange about the article, formed by producing the article initially with a hollow rib, then suitably compacting the sides of this rib together, and if desired coalescing them by suitable means, such as the application of heat and pressure, to form a substantially unitary flange portion extending around the article.

Other and more detailed objects of the present invention will become apparent from the following specification and appended claims when taken in connection with the accompanying drawings, in which:

Figures 1 to 6 inclusive are a series of diagrammatic views in vertical section illustrating successive process steps and the relationships of a molding implement to a bath of a liquid plastic material during the formation of an article;

Fig. 7 is a fragmentary assembly view, principally in vertical section, illustrating one type of arrangement for removing surplus plastic material from the mouth of a bottle;

Fig. 8 is a composite fragmentary view illustrating a preferred method of compacting the shoulder wall formation or hollow annular rib to form a peripheral flange, the left half of the figure showing the compacting about to begin, and the right half, the compacting substantially completed; and Fig. 9 is a view in vertical section of a bottle made by the process of this application.

The materials usable for making articles according to my present invention all fall in the general classification of "liquid plastic materials," by which is meant any one or more organic plastic materials in liquid form, including solutions of one or more organic plastic materials, colloidal sols thereof in non-solvent liquid carrying vehicles, molten baths of thermo-plastic material which may be converted to a molten state by heat, pressure or both; also materials which are initially liquid and which may be made solid either by polymerization or by some other treatment. Among the specific materials which I contemplate using are solutions of cellulose derivatives such as cellulose acetate, cellulose nitrate, benzyl cellulose, etc., alone or compounded with other normally liquid or solid organic materials, including plasticisers, resins (natural or artificial), and/or fillers, etc. The plastic materials may be such as to produce either transparent or opaque articles and they may be used alone or with suitable pigments or dyes to produce articles of a desired color. By the term "liquid plastic material" I intend to include any organic plastic material as aforesaid which has a sufficiently low viscosity to flow under conditions of the process herein disclosed.

I further contemplate that either thermo-plastic or thermo-setting materials may be used in carrying out my process, also that any desired combination of two or more of the above or other suitable materials may be employed, the limitations being that the basic material must be of an organic plastic nature and the material as a whole must be convertible to a liquid, from which liquid a film may be formed, which film may be rigidified in some suitable manner to form an article.

In Figs. 1 to 5, there are shown a bath of a liquid plastic material 5, which is contained within a suitable container 101, and a suction mold 40 in the cavity of which an article is to be formed. The mold 40 may be made up of cooperating mating portions or halves meeting as indicated by the line 102, Figs. 1 and 2. The mold is completed by a suitable bottom plate 103. It will be understood that the mold may be suitably supported and mounted for movement as in a manner hereinafter described, by any desired mechanism (not shown).

In Fig. 1, the mold 40 is shown about to approach the surface 104 of the bath of liquid plastic material 5, the open end of the mold being directed downwardly toward the surface of the liquid material.

Within the bath of the liquid plastic material and arranged with a vertically disposed portion in alignment with the lower open end of the mold 40 is a hollow tube 41, the upper end of which at the lower position of the tube projects slightly above the surface 104 of the liquid material 5. As the lower surface 43 of the mold 40 surrounding the opening 42 of the entrance cavity 51 of the mold touches the surface of the liquid, the open upper end of the tube 41 is moved upwardly out of the liquid by suitable means (not shown), while at the same time partial vacuum is applied to the mold cavity 44 through a plurality of passages or capillary ducts 45 suitably formed in the walls of the mold 40. These passages all communicate in any desired manner, as through a header pasasge 105, with a central vacuum conducting passage 46 communicating with the bottom plate 103, the vacuum passages in the bottom plate suitably registering with corresponding vacuum passages in the walls of the mold, as shown. It will be understood that the passage 46 communicates with a suitable source of subatmospheric pressure (not shown) and that suitable means, also not shown, are provided by which the vacuum to the mold may be controlled. In this way, the mold cavity 44 is filled with the liquid plastic material 5, as indicated in Figs. 2 and 3, the tube 41 moving upwardly during this filling operation to about the position shown in Fig. 3, at which its upper end is located adjacent to but spaced from the upper end of the mold cavity 44.

As and after the mold cavity 44 is progressively filled as aforesaid, superficial coagulation or solidification of the plastic material takes place along the walls 50 of the mold cavity. The actual depth to which surface coagulation extends depends, of course, upon the composition and character of the liquid plastic material. With a cellulose derivative solution and a heated mold, the vacuum in the mold will provide increased viscosity and skin cohesiveness in the surface layer of plastic material. In any event, the plastic material is deposited as a semi-solid film on the walls of the mold cavity.

After a certain time interval required to produce inceptive cohesiveness as aforesaid in the layer of plastic material in contact with the mold walls, the liquid central body portion of the plastic material is caused or permitted to flow out of the mold cavity. This may be done by the admission of air under pressure to the mold cavity through the tube 41. Due to the fact that the liquid material within the mold cavity is above the surface 104 of the bath of the liquid material 5, the air supplied or permitted to flow into the mold cavity through the tube 41 may be at atmospheric or superatmospheric pressure, the purpose being to permit the central body portion of liquid material to flow out of the mold cavity leaving a film layer of plastic material adhering to the walls thereof due to the inceptive cohesiveness produced as aforesaid and held thereto by the continued application of suction through the passages 45 and 46.

Before this action takes place, outside cross ribs 47, Fig. 9, of the bottle 39 have been formed in recessed grooves 49 in the bottom plate 103, Figs. 1 and 2. This action takes place before and during the time the air space 48, Fig. 3, is being expanded as indicated in Figs. 3 and 4, and the central body of liquid is flowing out of or being expelled from the mold cavity and returned to its source, the bath 5 of liquid material in the container 101.

The vacuum which is continuously applied as aforesaid through the mold walls is instrumental in holding the now relatively firm film to the walls of the mold cavity. The combined action of the air pressure supplied through the tube 41, the vacuum through passages 45, the heat of the mold (if such heat is applied), is effective in removing solvents (if such be used) and in so fixing the internal stress factors in the film structure as to prevent subsequent warping to a great extent. It will be understood that the mold 40 may be suitably heated by means (not shown) if this action is desired in view of the characteristics of the plastic material being used.

As the liquid plastic material is caused to recede downwardly to a point below the actual lip wall of the bottle mold, the application of air under pressure through the tube 41 may be discontinued and the hollow space within the film article thus formed may be partially evacuated, also through the tube 41, which aids in the removal of solvents (if such be used) from the layer of plastic material on the inner walls of the mold cavity.

If it is desired to produce an article having thicker walls at some or all portions than could be produced by a single film layer, formed as aforesaid, the tube 41 may again be raised to about the position shown in Fig. 3, or possibly even higher, vacuum applied therethrough and the inside of the film article, formed as aforesaid, filled with the liquid plastic material drawn up as heretofore described. This will result in the deposition of a second film layer inside the first layer, and, hence, will leave a thicker film when the central liquid portion is again caused to flow out of the mold cavity. As many successive film layers as desired may be deposited in this manner to form an article having walls of a desired thickness.

Furthermore, should it be desired that the shoulder portions only of a bottle 39, Fig. 9, for example, be made thicker than other portions thereof, or that the neck portions only be strengthened by providing a thicker wall section, a predetermined amount only of air may be withdrawn from the interior of the article through the tube 41, which is raised to an intermediate position within the mold cavity for this purpose and a partial resurgence only of the liquid plastic material thereby caused to form a thickened film wall on the desired portion of the article.

The lip portion 53 of the mouth of the bottle, Fig. 9, is the last portion to be formed, as indicated in Fig. 5, wherein the liquid plastic material is shown substantially completely expelled from the mold cavity. In order not to disturb the lip wall 53 of the bottle as the liquid material is flowing from the mold cavity as aforesaid, the entrance cavity 51 is provided in the mold which enables the air supplied through the pipe 41 to move the liquid plastic material transversely downwardly and outwardly away from the film layer which is to form the article, while the air pressure forces the plastic lip formation against the mold. Within this cavity 51, there is, however, usually formed a cone-shaped apron of plastic material, as shown at 106, Fig. 7, which portion may be trimmed off as shown in that figure and as hereinafter to be described.

When the mold 40 is removed from contact with the liquid plastic material, as shown in Fig. 6, the film bottle or article formed therein may still be acted upon and held to the walls 50 of the mold cavity by the vacuum action through passages 45. This film is now rigidified in situ in a suitable manner, depending upon the characteristics of the plastic material being employed. If a solution of a plastic material in a volatile solvent is being used, the solvent may be suitably evaporated by the combined action of the vacuum effective on the outside of the article through the passages 45 and by the circulation of air into and out of the interior of the article. This air may be supplied to the interior of the article through the tube 41, or through some other tube (not shown), and may be permitted to exhaust through the mouth of the bottle at the open lower end of the mold cavity. Fluid solvent removers or suitable film coagulating or rigidifying means may also be used, depending on the nature of the plastic material employed, it being understood that if a liquid treating material is used, such as are commonly used with cellulose xanthate or viscose materials, the fluid so used may be sprayed onto the film to be treated or the mold may be reverted to a neck-up position and the interior of the article filled with the treating fluid. Also, when plastic materials of the thermo-setting types or vulcanizable materials are employed, heat may be suitably applied to the mold for rigidifying the film article therein.

When the film walls of the article have been suitably rigidified, the mold is opened in any appropriate manner and the article is removed therefrom. The next step is usually the trimming or finishing of the neck portion of the article, which may be accomplished as shown in Fig. 7. As shown, the apron 106 formed within the entrance cavity 51 of the mold may be trimmed or sheared from the desired article by holding the bottle neck in a cutter block 61, while a tubular cutter 62 is caused to descend, the cutting edge 63 thereof engaging a cooperating edge 64 of the block 61, thereby shearing the surplus film 106 from the lip wall 53 of the bottle and forming a finished edge 38, Fig. 9. It will be understood that this is but one possible form of means for accomplishing this general purpose, and that other equivalent means may be substituted if desired.

In forming certain types of articles, it may be desired to provide an annular rib surrounding the article. Such a rib may be formed, as may any other desired configuration for the article, by forming in the mold cavity a groove as indicated at 107, Figs. 1 and 2, thus providing for the forming of an article having a hollow rib as shown at 108, Figs. 5, 6 and 8. For certain types of bottles a rib of this form may be sufficient. It may, however, be desired that a relatively rigid flange be formed at this point, for which purpose the rib 108 is first formed as aforesaid and then, preferably before the film wall has been fully rigidified, this hollow rib is compacted, as diagrammatically illustrated in Fig. 8, wherein the rib 108 of the article is shown as being compacted between a pair of annular members 109 and 110, which are caused to move from the position shown at the left of this figure to the position shown at the right thereof for compacting the hollow rib 108 into a substantially solid flange 60. The pressure employed in forming this flange may be aided, depending upon the nature of the material, by the application of heat, which may be suitably applied to the members 109 and 110 in any desired manner. When using certain types of materials, the application of heat and pressure as shown in Fig. 8 produces an actual coalescence of the material to form a substantially solid integral flange at 60. Alternatively, single-ply ribs may be formed at the position of the hollow rib 108, or at any other desired position on the article, by forming suitable grooves in the mold walls corresponding structurally to the grooves 49, Figs. 1 and 2. Such single-ply ribs or webs may be employed, if desired, for reinforcing the article.

The mold 40, or any of the parts thereof, may be heated or cooled in any desired manner, the temperature being chosen in accordance with the properties of the material used in forming the articles. With certain kinds of film structures, also depending on the nature of the plastic material being employed, it may be advantageous to subject the film walls to internal fluid pressure while still in the mold and while being externally acted upon by vacuum as aforesaid. Such a method step is within the purview of this invention. In carrying out this step, a suitable nozzle (not shown) may be placed in the mouth cavity 51 and the interior of the article within the mold 40 may then be supplied with suitable fluid through the nozzle under a desired pressure to press the walls of the film article against the walls of the mold cavity.

While I have diagrammatically illustrated and described but a few of the possible variations and details of the method of my present invention, it will be understood that changes may be made within the general teachings thereof. I do not wish to be limited, therefore, except by the scope of the appended claims, which are to be construed as broadly as the state of the prior art permits.

I claim:

1. The method of forming a hollow article having walls of different thicknesses from liquid plastic material, comprising the steps of introducing liquid plastic material into a mold cavity to deposit a film on the walls thereof, recurrently causing the liquid plastic material to contact with those portions of the walls of the mold cavity and the film deposited thereon which are to be made of thicker wall section while those other portions where a thinner wall section is desired have the liquid plastic material brought into contact therewith a fewer number of times, and rigidifying the plastic material, so deposited, in situ on the walls of the mold cavity.

2. The method of forming a hollow article from liquid organic plastic material, comprising the steps of drawing liquid plastic material by suction into a mold cavity to deposit a film on the walls thereof, continuing the application of suction to the outside of said film while in the mold, applying superatmospheric pressure to the inside of said film while in the mold through the opening of said cavity through which the liquid plastic material was drawn, and rigidifying the film article in situ against the walls of the mold cavity.

3. The method of forming a hollow article from liquid plastic material, comprising the steps of bringing the open end of a mold, having a cavity the shape of the article to be made, into contact with a bath of liquid plastic material, creating a vacuum in the mold to cause the liquid plastic material to fill the cavity thereof, applying heat to the material in the mold through the walls thereof, and thereby aiding the deposit of a film of plastic material on the walls, introducing a gaseous fluid under pressure into the interior of the mold cavity to cause the central body portion of the liquid plastic material to flow therefrom leaving the film deposited on the walls of the mold cavity, and rigidifying in situ the film thus deposited.

4. The method of forming a hollow article from liquid plastic material, comprising the steps of bringing the open end of a mold, having a cavity the shape of an article to be made, into contact with a bath of liquid plastic material, creating a vacuum in the mold to cause the liquid plastic material to fill the cavity thereof and to deposit a film of plastic material on the surface of the mold cavity, introducing a gaseous fluid under superatmospheric pressure into the interior of the mold cavity through the opening of said cavity through which the liquid plastic material was introduced to cause the central body portion of the liquid plastic material to flow therefrom, leaving the film deposited on the walls of the mold cavity, and rigidifying in situ the film thus deposited.

5. The method of forming a hollow article from liquid plastic material, comprising the steps of bringing the open lower end of a mold, having a cavity the shape of an article to be made, into contact with a bath of liquid plastic material, creating a vacuum in the mold to cause the liquid plastic material to fill the cavity thereof and to deposit a film of plastic material on the walls of the mold cavity, introducing a tube vertically upwardly into the mold cavity through the lower open end thereof to a point such that its upper end is adjacent to but spaced from the upper wall of the mold cavity, supplying air under pressure through the tube to cause the center body portion of liquid plastic material to flow out of the mold cavity leaving the film deposited on the walls thereof, and rigidifying in situ the film thus formed.

6. The method of forming a hollow article from liquid plastic material, comprising the steps of bringing the lower open end of a mold, having a cavity the shape of an article to be made, into contact with a bath of liquid plastic material, creating a vacuum in the mold to cause the liquid plastic material to fill the cavity thereof and to deposit a film of plastic material on the walls of the mold cavity, introducing a vertically disposed tube into the mold cavity through the open lower end thereof, supplying air under pressure through the tube to cause the central body portion of liquid plastic material to flow out of the mold cavity leaving a film of plastic material on the walls thereof, reversing the pressure through the tube and thus evacuating the mold cavity to cause a resurgence of the liquid plastic material therein to apply an additional film coating on the inside of at least a portion of the film first deposited, again reversing the pressure in the tube and again supplying air under pressure therethrough to cause the central body portion of liquid plastic material to flow out of the mold cavity leaving a thickened film layer on the walls thereof, and rigidifying in situ the film layer thus formed.

7. The method of forming a hollow article from liquid plastic material, comprising the steps of bringing the open lower end of a mold, having a cavity the shape of an article to be made, into contact with a bath of liquid plastic material, creating a vacuum in the mold to cause the liquid plastic material to fill the cavity thereof and to deposit a film of plastic material on the walls of the mold cavity, introducing a vertically disposed tube into the mold cavity through the open lower end thereof, supplying air under pressure through the tube to cause the central body portion of liquid plastic material to flow out of the mold cavity leaving a film of plastic material on the walls thereof, withdrawing a predetermined amount of air from the interior of the mold cavity through the tube to cause a resurgence of the liquid plastic material up to a predetermined point in the mold cavity to deposit an additional layer of plastic material on a predetermined part only inside the initial film layer formed as aforesaid, then again supplying pressure through the tube to cause the central body portion of liquid plastic material to flow from the mold cavity leaving a film article therein having walls of different selected thicknesses, and rigidifying in situ the film article thus formed.

8. The method of forming a hollow article from a solution of plastic material in a volatile solvent, comprising the steps of bringing the open end of a mold, having a cavity the shape of an article to be made, into contact with a bath of a plastic solution, creating a vacuum in the mold to cause the plastic solution to fill the cavity thereof and to deposit a film of plastic material on the walls of the mold cavity, introducing a gaseous fluid under pressure into the interior of the mold cavity to cause the central body portion of the plastic solution to flow therefrom leaving the film deposited on the walls of the mold cavity, and rigidifying in situ the film thus deposited by the evaporation of the volatile solvent caused at least in part by the vacuum continuously applied as aforesaid.

9. The method of forming a hollow article from a solution of plastic material in a volatile solvent, comprising the steps of bringing the open end of a mold, having a cavity the shape of an article to be made, into contact with a bath of a plastic solution, creating a vacuum in the mold through the walls thereof to cause the plastic solution to fill the cavity thereof and to deposit a film of plastic material on the walls of the mold cavity, introducing a gaseous fluid under pressure into the interior of the mold cavity to cause the central body portion of the plastic solution to flow therefrom leaving the film deposited on the walls of the mold cavity, and rigidifying in situ the film, thus formed, by evaporating the volatile solvent by the joint action of the vacuum applied through the mold walls as aforesaid and by circulating air through the interior of the film article so formed.

10. The method of forming a hollow article from liquid plastic material, comprising the steps of bringing the open end of a mold, having a cavity the shape of an article to be made, into contact with a bath of liquid plastic material, creating a vacuum in the mold to cause the liquid plastic material to fill the cavity thereof and to deposit a film of plastic material on the walls of the mold cavity, introducing a gaseous fluid under pressure into the interior of the mold to cause the central body portion of the liquid plastic material to flow therefrom leaving the film deposited on the walls of the mold cavity, and rigidifying in situ the film, thus formed, by the application of a coagulating fluid internally thereof.

11. The method of forming a hollow article from liquid plastic thermo-setting material, comprising the steps of bringing the open end of a mold, having a cavity the shape of an article to be made, into contact with a bath of such a liquid plastic material, creating a vacuum in the mold to cause the liquid plastic material to fill the cavity thereof and to deposit a film of plastic material on the walls of the mold cavity, introducing a gaseous fluid under pressure into the interior of the mold cavity to cause the central body portion of the liquid plastic material to flow therefrom leaving the film deposited on the walls of the mold cavity, and rigidifying in situ the film, thus deposited, by the application of heat through the walls of the mold cavity.

12. The method of forming a hollow article such as a bottle from liquid plastic material, comprising the steps of bringing the open end of a mold, having a cavity the shape of an article to be made and having an additional entrance cavity communicating therewith, into contact with a bath of liquid plastic material, creating a vacuum in the mold to cause the liquid plastic material to fill the entire cavity thereof and to deposit a film of plastic material on the walls of such entire cavity, introducing gaseous fluid under pressure into the interior of the mold cavity to cause the central body portion of the liquid plastic material to flow therefrom leaving the film deposited on the walls of the mold cavity as aforesaid, rigidifying in situ the film thus deposited, opening the mold and removing the film article thus formed, and mechanically trimming the surplus film at the neck portion of the article to remove that portion of the film formed on the walls of the entrance cavity of the mold.

13. The method of forming a hollow article from liquid plastic material, comprising the steps of bringing the open end of a mold, having a cavity approximating the shape of an article to be made and including an annular groove to form a hollow peripheral rib, into contact with a bath of liquid plastic material, creating a vacuum in the mold to cause the liquid plastic material to fill the cavity thereof and to deposit a film of plastic material on the walls of the mold cavity, introducing a gaseous fluid under pressure into the interior of the mold cavity to cause the central body portion of the liquid plastic material to flow therefrom leaving the film deposited on the walls of the mold cavity and having a hollow peripheral rib, at least partly rigidifying in situ the film thus deposited, opening the mold and removing the film article therefrom, and compacting the side portions of the hollow rib together to form a peripheral flange around the article.

14. The method of forming a hollow article from liquid plastic material, comprising the steps of bringing the open end of a mold, having a cavity approximating the shape of the article to be made and including an annular groove to form a hollow peripheral rib, into contact with a bath of liquid plastic material, creating a vacuum in the mold to cause the liquid plastic material to fill the cavity thereof and to deposit a film of plastic material on the walls of the mold cavity, introducing a gaseous fluid under pressure into the interior of the mold cavity to cause the central body portion of the liquid plastic material to flow therefrom leaving the film deposited on the walls of the mold cavity and having a hollow peripheral rib, at least partly rigidifying in situ the film thus deposited, opening the mold and removing the film article therefrom, and compacting the sides of the rib together by the joint application of heat and pressure to cause a coalescence of the compacted side portions of the rib and thereby to form a solid peripheral flange around the article.

15. The method of forming a hollow article from thermo-plastic material in a liquid state, comprising the steps of bringing the open end of a mold, having a cavity the shape of an article to be made, into contact with a bath of such a liquid thermo-plastic material, creating a vacuum in the mold to cause the liquid plastic material to fill the cavity thereof and to deposit a film of plastic material on the walls of the mold cavity, introducing a gaseous fluid under pressure into the interior of the mold cavity to cause the body portion of the liquid plastic material to flow therefrom leaving a film deposited on the walls of the mold cavity, and rigidifying in situ the film thus deposited by controlling the temperature of the walls of the mold so as controllably to abstract heat from the thermo-plastic material.

ENOCH T. FERNGREN.